No. 877,460. PATENTED JAN. 21, 1908.
K. BRUNNER & O. BÜHRING.
APPARATUS FOR SEPARATING LIQUIDS FROM GASES OR VAPORS.
APPLICATION FILED MAR. 29, 1907.

Witnesses
Stanley Wood
Herbert Cox

Inventors
Karl Brunner
Otto Bühring
by
W. Evans
Attorney

No. 877,460. PATENTED JAN. 21, 1908.
K. BRUNNER & O. BÜHRING.
APPARATUS FOR SEPARATING LIQUIDS FROM GASES OR VAPORS.
APPLICATION FILED MAR. 29, 1907.

3 SHEETS—SHEET 2

Witnesses
Stanley Wood
Herbert Cox

Inventors
Karl Brunner
Otto Bühring
by
W. E. Evans
Attorney.

No. 877,460. PATENTED JAN. 21, 1908.
K. BRUNNER & O. BÜHRING.
APPARATUS FOR SEPARATING LIQUIDS FROM GASES OR VAPORS.
APPLICATION FILED MAR. 29, 1907.

3 SHEETS—SHEET 3.

Witnesses
Stanley Wood
Herbert Cox

Inventors
Karl Brunner
Otto Bühring
by W. T. Evans
Attorney.

UNITED STATES PATENT OFFICE.

KARL BRUNNER AND OTTO BÜHRING, OF MANNHEIM, GERMANY.

APPARATUS FOR SEPARATING LIQUIDS FROM GASES OR VAPORS.

No. 877,460.      Specification of Letters Patent.      Patented Jan. 21, 1908.

Application filed March 29, 1907. Serial No. 365,436.

*To all whom it may concern:*

Be it known that we, KARL BRUNNER, a subject of the German Emperor, and OTTO BÜHRING, a subject of the German Emperor, both residing at Mannheim, (Baden,) in the Empire of Germany, whose post-office address is Mannheim, Germany, have invented a certain new and useful apparatus for separating liquids from gases or vapors by means of tubes arranged transversely to the direction of flow, of which the following is a specification.

This invention relates to apparatus for separating liquids from gases and vapors of that type wherein several rows of tube are arranged within a casing through which gases or vapors flow, and transversely to the direction of flow. Now according to this invention the tubes in question are so constructed that their walls which are turned towards the direction of flow are furnished with perforations resembling those of a sieve while their walls which are turned away from the direction of flow are not thus perforated. As the vapor or gas flows past the perforated portions, the heavier particles, such as oil or other liquid particles pass into the interior of the tubes where they are precipitated and are then collected and removed. As the walls of the tubes which are turned away from the direction of flow of the gases are not provided with perforations, it is impossible for the liquid particles to escape from the tubes, but they must remain stationary therein with the result that particles once separated cannot again be carried along by the gas.

The accompanying drawings illustrate by way of example several methods of constructing and arranging tubes of the kind referred to in accordance with this invention.

Figure 1:
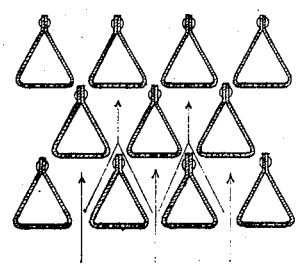
Figure 2:
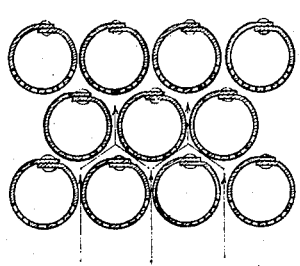

Figures 1 and 2 show the two simplest embodiments of the invention. The tubes shown in Fig. 1 are each of triangular cross section and are furnished with perforations on that side which is turned towards the direction of flow of the gas or vapor, which is indicated by arrows. The tubes shown in Fig. 2 are of circular cross section and in each of them that half of the periphery which is turned towards the direction of flow is perforated like a sieve.

Figure 3:
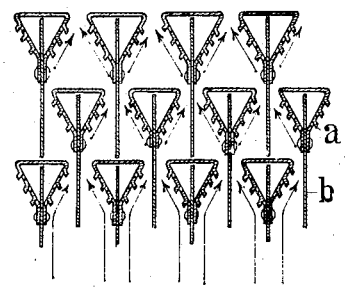
Figure 4:
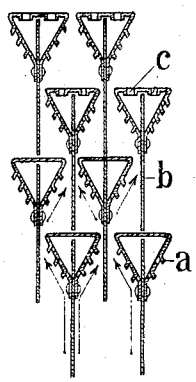

Figs. 3 and 4 show somewhat more complicated arrangements. In this instance the tubes are again of triangular cross section, but they have each two perforated sides which are turned towards the direction of flow. The perforations in these sides are provided with projections $a$ which are turned towards the direction of flow in such manner as to deprive the gas or vapor of its heavier particles. As in the arrangements shown in Figs. 1 and 2 the tubes are arranged transversely to the direction of flow and are each provided with a partition $b$ that is arranged parallel to the direction of flow and projects from the tube in such manner as to pass between the two tubes just in front of it. These partitions cause the vapor to flow in a zig-zag course that is to say, always along the perforated sides of the tubes and thus cause an effectual separation of the oil. In the case of the last row of tubes shown in Fig. 4 there are, moreover, provided on that side which is turned away from the direction of flow, a few apertures $c$ for the purpose of preventing the formation of a vapor buffer in the interior of the tubes which might injuriously affect the action of the apparatus.

Figure 5:
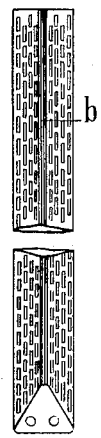

Fig. 5 shows in front view a tube as is shown in Fig. 3.

Figure 6:
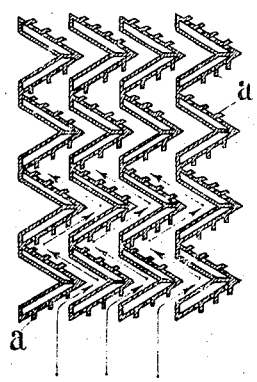
Figure 7:
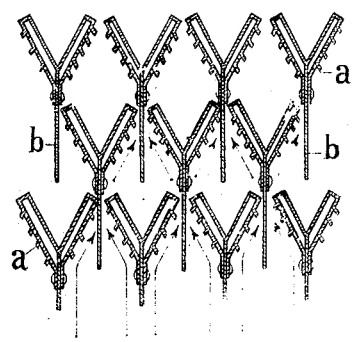

Figs. 6 and 7 illustrate two modifications similar to those shown in Figs. 3 and 4 except that the plain side of each of the tubes is inwardly bent between the two perforated sides so as considerably to decrease the hollow space within the tube. Fig. 6 shows each tube so arranged that the point of the triangle is turned transversely to the direction of flow, the longitudinal walls of the tubes being joined together while their transverse walls project into the space between them. The arrangement of the tubes shown in Fig. 7 is similar to that shown in Figs. 3 and 4.

Figure 8:
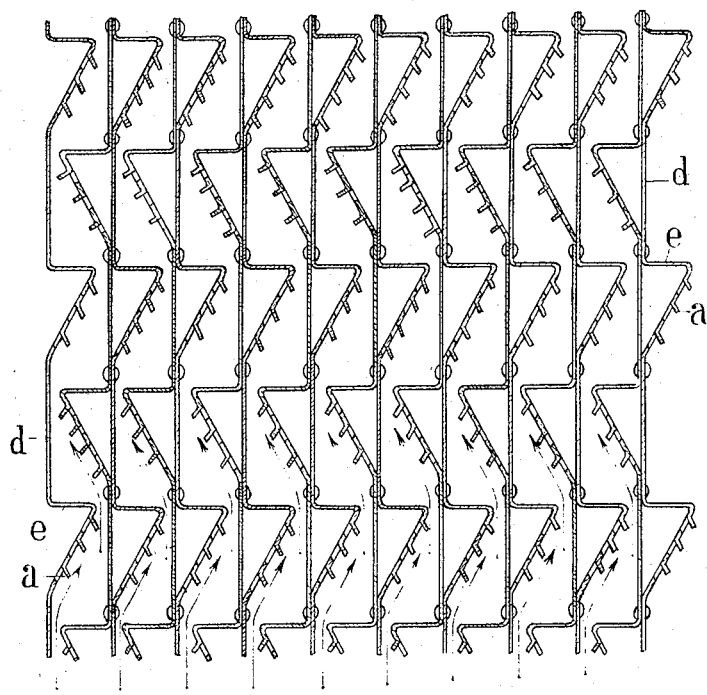

Fig. 8 shows a constructional form wherein the tubes are formed by two pieces of sheet metal $d$ which run in the direction of flow and are connected with each other and provided with triangular projections $e$ which are displaced in relation to each other.

Figure 9:
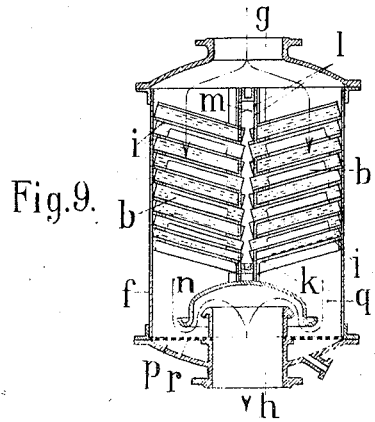
Figure 10:
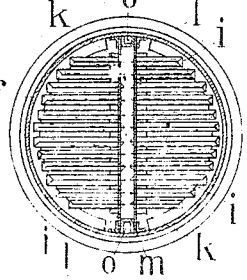

Figs. 9 and 10 show in longitudinal and transverse section respectively a device for separating liquids wherein tubes of the shape shown in Fig. 3 but of varying length are arranged one above another in two groups within an upright cylindrical or hollow drum $f$ into which the vapor enters at the top at $g$ and from which it escapes at the bottom at $h$. The tubes are supported in an oblique position upon ledges $i$ and $k$ which are attached to the shelf and to two vertical transverse partitions $l$ arranged in the center thereof, and they all terminate within the space $m$ between the two partition walls $l$. The oil consequently flows out of the tubes into the space $m$ whence it passes through the orifices $n$ (Fig. 9) of the lateral iron troughs and through the passages $o$ formed between these troughs and the shell (Fig. 10) into the collecting chamber $p$ which is separated from the steam space $q$ by means of a sieve $r$.

Figure 11:
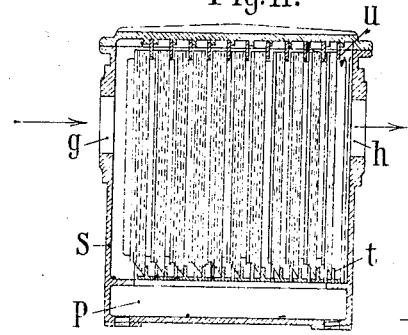
Figure 12:
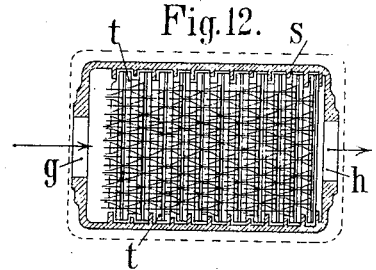

Figs. 11 and 12 show in longitudinal and transverse section, respectively, another modification of separating apparatus. In this instance the tubes are arranged vertically in proximity to each other within a rectangular casing $s$ of cast iron. The vapor enters on one side at $g$, passes between the tubes and escapes on the other side at $h$, the oil which has been separated flowing directly from the tubes into the collecting chamber $p$. The lower ends of the tubes are secured to T-irons $t$ which are arranged upon horizontal and between vertical ribs on the walls of the casing, and their upper ends are secured to iron flanges $u$ which lie against transverse ribs on the cover of the casing.

Figure 13:
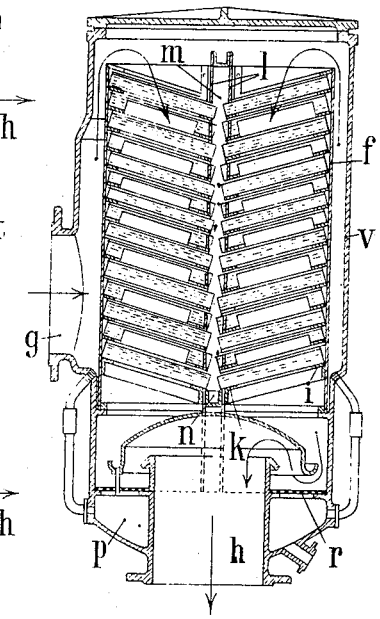
Figure 14:
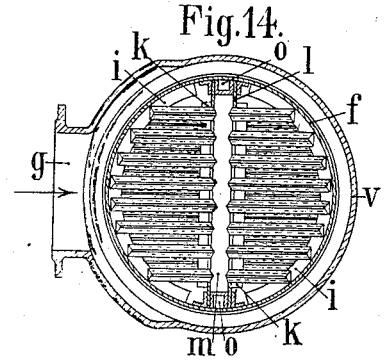

Figs. 13 and 14 illustrate respectively in longitudinal and transverse section, a still further modification identical in its essential features with the arrangement shown in Figs. 9 and 10, with the exception that the shell is situated within a cylindrical casing $v$ of cast iron into which steam enters from the side at $g$, and escapes at the bottom at $h$.

Figure 15:
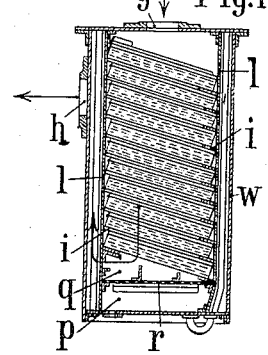

Fig. 15 shows in vertical section a separator wherein the tubes are built one above the other into a rectangular casing $w$ of sheet metal, into which the vapors enter from above at $g$. The tubes are obliquely arranged, as in the forms of apparatus illustrated in Figs. 9, 10, 13 and 14, on ledges $k$, which are attached to vertical transverse walls $l$, the right wall being provided immediately above the ledges with apertures through which the separated oil flows out of the tubes into a chamber that is situated between the wall $l$ and the right wall of the casing, and is connected at the bottom by means of a pipe with the collecting chamber $p$. The left partition is perforated beneath the lowest tube, so that the vapor can pass through these perforations into the space between it and the left wall of the casing, from which it escapes at $h$. The collecting chamber $p$ and the vapor chamber $q$ are again separated by means of a sieve $r$.

Figure 16:
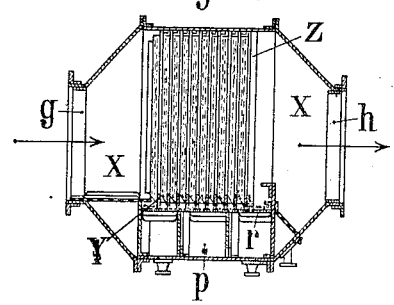
Figure 17:
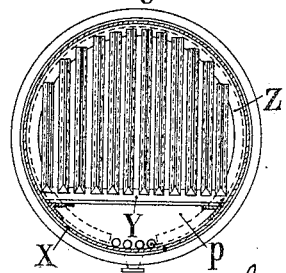

Finally Figs. 16 and 17 show in longitudinal and transverse section respectively a separator wherein the tubes are vertically arranged adjacent to each other within a horizontal cylindrical shell $x$. As in the constructional form of apparatus illustrated in Figs. 11 and 12 the vapor enters at one side at $g$, passes between the tubes, and escapes at the other side at $h$, while the oil which has been separated out flows from the tubes through the sieve $r$ into the collecting chamber $p$. The tubes are secured at the top to annular angle irons $z$ and at the bottom to T-irons $y$ attached to the shell.

What we claim as our invention and desire to secure by Letters Patent is:—

1. An apparatus for separating liquids from gases and vapors by means of tubes built into the apparatus transversely to the direction of flow and perforated on the sides turned towards the direction of flow, characterized by the fact that the tubes are displaced in relation to each other transversely to the direction of flow and that there is arranged within each tube a partition which is parallel to the direction of flow and which projects beyond the tube and between the two tubes immediately in front of it.

2. An apparatus for separating liquid from gases and vapors by means of tubes arranged transversely to the direction of flow of the gases and perforated on the sides turned towards the direction of flow characterized in that the sides of the tubes which are turned away from the direction of flow are provided with a few apertures.

3. An apparatus for separating liquid from gases and vapors by means of tubes arranged transversely to the direction of flow of the gases and perforated on the sides turned towards the direction of flow characterized by the fact that the tubes are formed by means of two metal sheets that are connected with each other, are arranged in the direction of flow, and are provided with projections displaced in relation to each other.

In testimony whereof we have hereunto signed our names to this specification in the presence of two subscribing witnesses.

KARL BRUNNER.
OTTO BÜHRING.

Witnesses:
H. W. HARRIS,
JOS. H. LEUTE.